United States Patent Office 3,464,981
Patented Sept. 2, 1969

3,464,981
SEPARATION PROCESS
John Edward Colchester, John Hubert Entwisle, and Maurice Berkeley Green, Runcorn, England, assignors to Imperial Chemical Industries Limited, London, England, a corporation of Great Britain
No Drawing. Filed Mar. 31, 1966, Ser. No. 538,958
Claims priority, application Great Britain, Apr. 6, 1965, 14,577/65
Int. Cl. C07d 31/22
U.S. Cl. 260—240                    11 Claims

ABSTRACT OF THE DISCLOSURE

There is provided a process for the separation of a 4:4′-bipyridylium salt from a mixture or solution containing it, which comprises treating a solution containing the said salt with amsonic acid, whereby the 4:4′-bipyridylium salt is precipitated as an insoluble derivative and the precipitate is separated from the solution.

---

This invention relates to a separation process useful in the production of herbicidal materials.

There is described a process for the production of bis-quaternary salts of 4:4′-bipyridyl, which are useful as herbicidal materials, from an N:N′-dialkyl-tetrahydro-4:4′-bipyridyl, a quinone and an acid. This process produces small proportions of an N-alkyl pyridinium salt as a byproduct. Other oxidising agents may be used in the place of the quinone but usually the reaction is then predominantly that of forming the N-methyl-pyridinium salt with relatively little of the bis-quaternary salt. In such processes it is very desirable to have not only a process for recovering the bis-quaternary salt (which is the commercially valuable material), but also a process which enables the N-alkyl pyridinium salt to be recovered. It is also very desirable to be able to recover the valuable bipyridylium salt from other mixtures or from dilute solutions containing it.

We have found that 4:4′-bipyridylium salts form an insoluble derivative with amsonic acid, which can be used for the purpose of separation or recovery.

Thus according to the present invention we provide a process for the separation of a 4:4′-bipyridylium salt from mixtures or solutions containing it which comprises treating a solution containing the said salt with amsonic acid, whereby the 4:4′-bipyridylium salt is precipitated as an insoluble derivative.

This process is especially applicable to bis-quaternary salts of 4:4′-bipyridyl and particularly to N:N′-dialkyl-4:4′-bipyridylium salts. The process is especially useful for separating such salts from admixture with an N-alkyl pyridinium salt.

Amsonic acid is a name commonly employed for 4:4′-diamino-stilbene-2:2′-disulphonic acid. As the acid itself is only sparingly soluble in water it is conveniently employed for the purpose of our invention in the form of an aqueous solution of one of its water-soluble salts, particularly an alkali metal salt or an ammonium salt.

The process is conveniently carried out at a pH in the range 7 to 12. At higher pH there is a tendency for the bipyridylium salt to decompose, and at lower pH there is a tendency for free amsonic acid to precipitate. The process is conveniently carried out at a temperature in the range 0 to 100° C.

The process of our invention may be conveniently carried out by taking the aqueous solution of mixed salts containing a 4:4′-bipyridylium salt and adding to this an aqueous solution of amsonic acid, for example as its disodium salt, in sufficient quantity to provide a slight excess over that calculated to be equivalent to the 4:4′-bipyridylium salt present. For this purpose the quantity required is easily calculated from an analysis of the solution or material used as starting material. If it is inconvenient to analyse the solution or calculate the amount of 4:4′-bipyridylium salt present, the solution containing the amsonic acid may be added until no further precipitation occurs. This mixing results in precipitation of the amsonic acid salt of the bipyridylium cation, which can then be collected by filtration, centrifuging, or any other convenient means, and can be freed from adhering solution by washing with water. The N-methyl pyridinium salt, or any other materials present, can be recovered from the filtrates if so desired, for example by evaporation.

The precipitated salt thus obtained can be converted into a soluble 4:4′-bipyridylium salt by treatment with an aqueous solution of an acid, particularly a mineral acid such as hydrochloric or sulphuric acid, whereby insoluble free amsonic acid is precipitated and the 4:4′-bipyridylium cation enters the aqueous phase. It is not absolutely necessary to weigh the acid for this stage, as the amsonic acid derivative is a dark blue-green colour and addition of acid can be continued just to the point when this colour disappears, thus indicating completion of reaction. By separation of the solid and solution phases the 4:4′-bipyridylium salt can then be recovered as an aqueous solution, and the amsonic acid as a solid which can be dissolved in dilute aqueous alkali and can then be used again for the recovery of further amounts of 4:4′-bipyridylium salt. The amsonic acid can also be recovered by solvent extraction with a solvent in which it is soluble.

The process of our invention has the advantage that it provides a very easy technique for recovering a 4:4′-bipyridylium salt from dilute solutions, and from admixture with a wide variety of other salts (particularly the closely-related pyridinium salts and 2:2′-bipyridylium salts). It also has the advantage that the 4:4′-bipyridylium salt is precipitated in a form which is very readily converted back to a soluble salt or a concentrated solution (in which form it is usually required in commerce) and in which the precipitating agent is readily recovered for re-use.

Our process is especially applicable to the conversion of one 4:4′-bipyridylium salt into another having a different anion, for example to the conversion of the chloride into the sulphate. For this purpose, the bipyridylium chloride solution is treated with a soluble amsonic acid salt, and the precipitated bipyridylium amsonate derivative is collected, washed and treated with the desired acid. This may serve, for example, to convert a corrosive salt into a less corrosive one.

The invention is illustrated but not limited by the following examples in which the parts and percentages are by weight unless otherwise stated.

Example 1

A solution of 125.5 parts of N:N-dimethyl-4:4′-bipyridylium dichloride and 28.2 parts of N-methyl pyridinium chloride in 500 parts of water was mixed with a solution of 194 parts of disodium salt of 4:4′-diamino-stilbene-2:2′-disulphonic acid in 1360 parts of water. The precipitated solid thus formed was recovered by filtration and washed with 1800 parts of water at approximately 18° C. The filtrate and washings were found by analysis to contain 27 parts of methyl pyridinium chloride and less than 5 parts of the bipyridylium salt.

The collected solid was then treated by washing with 1800 parts of 1 M hydrochloric acid followed by 1600 parts of water. This procedure yielded a solid residue of insoluble amsonic acid which, after drying, weighed 181 parts; this represents an almost quantitative recovery of the amount used. The aqueous solution contained N:N'-dimethyl-4:4'-bipyridylium dichloride, which can be recovered by evaporation to dryness.

Example 2

Amsonic acid was dissolved in 10% aqueous ammonia solution by warming to 50° C. and then boiling off the excess of ammonia. A solution of N:N'-dimethyl-4:4'-bipyridylium dichloride was mixed with an equimolecular proportion of the ammonium amsonate solution prepared as described above, and the dark blue-green precipitate so formed was collected by filtration and washed thoroughly with water until the washings were free from chloride ion. The damp solid was suspended in water at 50° C. and treated with the calculated amount of the chosen acid. The mixture was then cooled, the precipitated amsonic acid was recovered by filtration and washed thoroughly with water, and the combined filtrate and washings were concentrated under reduced pressure. This concentration can be carried out to give a solution of any desired strength. Recovery of the bipyridylium salt and the amsonic acid was practically quantitative.

This procedure was carried out using sulphuric acid, methyl-sulphuric acid, formic acid, oxalic acid, tartaric acid, citric acid and phosphoric acid, to form the correponding N:N'-dimethyl-4:4'-dipyridylium salts.

The following table summarises the results obtained.

| Acid | Percent recovery of the bipyridylium ion | Percent recovery of the amsonic acid |
| --- | --- | --- |
| Sulphuric | 99.6 | 98.5 |
| Phosphoric | 97.4 | 97.6 |
| Formic | 98.1 | 99.1 |
| Oxalic | 97.1 | 96.8 |
| Citric | 96.5 | 98.2 |
| Tartaric | 98.2 | 97.4 |
| Methylsulphuric | 98.5 | 96.9 |

A sample of the precipitated amsonic acid salt was dried, and then treated with sulphuric acid; 5.00 g. thus gave 1.64 g. of the bipyridylium ion (determined polarographically) and 3.30 g. of amsonic acid.

Found: Bipyridylium ion, 32.8% amsonic acid 66.0%. Required for formula $C_{12}H_{14}N_2 \cdot C_{14}H_{14}N_2O_6S_2$: Bipyridylium ion 33.4%, amsonic acid 66.6%.

Example 3

Aqueous solutions of each of the following bipyridylium salts were made up and mixed with an aqueous solution of the ammonium salt of amsonic acid, as in Example 1:

(a) The bis-quaternary salt formed from 4:4'-bipyridyl and N:N'-dimethyl chloracetamide.
(b) The bis-quaternary salt formed from 4:4'-bipyridyl and N:N'-diethyl chloracetamide.
(c) The bis-quaternary salt formed from 4:4'-bipyridyl and N-chloracetyl-3:5-dimethyl morpholine.
(d) N:N'-diethyl-4:4'-bipyridylium di-iodide.

Insoluble precipitates of the amsonic acid salts of the bipyridylium cations were formed in a similar manner to that formed in the procedure described in Example 1.

What we claim is:

1. A process for separating an N:N'-dialkyl-4:4'-bipyridylium salt from an N-alkyl pyridinium salt admixed therewith which comprises treating an aqueous solution of said mixture with amsonic acid whereby the 4:4'-bipyridylium salt is precipitated as an insoluble derivative of amsonic acid and the N-alkyl pyridinium salt remains in solution, the precipitate being thereafter removed from the solution.

2. Process as claimed in claim 1 wherein the amsonic acid is used in the form of an aqueous solution of a water-soluble salt.

3. Process as claimed in claim 1, wherein the amsonic acid is used in the form of its alkali metal or ammonium salt.

4. Process as claimed in claim 1, wherein the treatment is carried out at a pH in the range 7 to 12.

5. Process as claimed in claim 1 wherein the treatment is carried out at a temperature in the range 0° C. to 100° C.

6. Process as claimed in claim 1 wherein the precipitated insoluble derivative is recovered and treated with an aqueous solution of an acid, whereby there is obtained an aqueous solution of a 4:4'-bipyridylium salt of the said acid together with solid amsonic acid.

7. Process as claimed in claim 1 wherein the acid used is a mineral acid.

8. Process as claimed in claim 1 wherein the acid used is sulphuric acid, hydrochloric acid or phosphoric acid.

9. Amsonic acid salt of 4:4'-bipyridylium salt.

10. Process as claimed in claim 1 wherein the said pyridinium salt is a N-methyl pyridinium salt.

11. Process as claimed in claim 1 wherein the said N:N'-dialkyl-4:4'-bipyridylium salt is an ethyl or methyl substituted salt.

References Cited

UNITED STATES PATENTS

| 2,766,249 | 10/1956 | Deinet et al. | 260—507 |
| 3,332,959 | 7/1967 | Braunholtz | 260—296 |

FOREIGN PATENTS 748,224   4/1956   England.

JOHN D. RANDOLPH, Primary Examiner

U.S. Cl. X.R.

71—94; 260—247.2, 296